US011265382B2

(12) United States Patent
Narayanasamy et al.

(10) Patent No.: US 11,265,382 B2
(45) Date of Patent: Mar. 1, 2022

(54) MANAGEMENT OF SENSOR DATA COLLECTED ACROSS SENSOR NODES

(71) Applicant: Lockheed Martin Corporation, Bethesda, MD (US)

(72) Inventors: Senthilkumar Narayanasamy, San Jose, CA (US); John Edward Metzger, Campbell, CA (US); Shaun B. Coleman, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/382,878

(22) Filed: Apr. 12, 2019

(65) Prior Publication Data

US 2020/0329104 A1 Oct. 15, 2020

(51) Int. Cl.
*G06F 15/16* (2006.01)
*H04L 67/125* (2022.01)
*H04B 7/185* (2006.01)
*H04L 67/63* (2022.01)

(52) U.S. Cl.
CPC ......... *H04L 67/125* (2013.01); *H04B 7/1851* (2013.01); *H04B 7/18504* (2013.01); *H04L 67/327* (2013.01)

(58) Field of Classification Search
CPC . H04L 67/125; H04L 67/327; H04B 7/18504; H04B 7/1851
See application file for complete search history.

(56) References Cited

U.S. PATENT DOCUMENTS

| 8,676,593 B2 * | 3/2014 | Nagpal | G06Q 30/02 705/1.1 |
| 9,148,414 B1 * | 9/2015 | Roth | H04L 63/08 |
| 2007/0065044 A1 * | 3/2007 | Park | G06K 9/00228 382/305 |
| 2015/0318916 A1 | 11/2015 | Gopal et al. | |
| 2015/0331930 A1 * | 11/2015 | Xing | G06F 16/54 707/723 |
| 2016/0037434 A1 | 2/2016 | Gopal et al. | |
| 2016/0255162 A1 * | 9/2016 | Frieder | H04L 67/20 709/204 |
| 2017/0111210 A1 * | 4/2017 | Chakrobartty | H04L 41/0681 |
| 2017/0364451 A1 * | 12/2017 | Zacks | G06F 12/1425 |
| 2019/0340816 A1 * | 11/2019 | Rogers | H04L 67/22 |

* cited by examiner

*Primary Examiner* — Ryan J Jakovac

(57) ABSTRACT

Systems, methods, and software described herein manage data from spaceborne and airborne nodes. In one implementation, a control system may obtain sensor data from sensors of spaceborne or airborne nodes. Once obtained, the control system may process the sensor data to determine metadata associated with the sensor data. Once processed, the sensor data may be stored in one or more data stores, such that applications may access the data based at least in part on the metadata.

16 Claims, 7 Drawing Sheets

MANAGEMENT OF SENSOR DATA COLLECTED ACROSS SENSOR NODES

BACKGROUND

Satellites and aircraft can be deployed to provide various task-based operations, such as military and civilian observation operations, communications operations, navigation operations, weather operations, and research operations. Satellites and aircraft can include various sensors and communication equipment that are used to perform these desired tasks. For example, a weather satellite may include one or more cameras or imaging sensors that can be used to take images of Earth, and communication equipment that can be used to communicate the images to a control system on Earth. An aircraft drone might include cameras for imaging portions of the Earth and relaying those images to a control station or system. Although satellites and aircraft can be configured to perform specialized operations, difficulties can arise from the movement of the satellites and aircraft in gathering the required data for the required operations. Further difficulties are encountered in managing and storing the data from multiple data sources, including satellites and aircraft, and providing the data in an effective manner to applications that require the data.

OVERVIEW

The examples described herein enhance management of sensor data from physical nodes of an observation platform. In one implementation, a method includes obtaining sensor data from sensors of physical nodes comprising airborne nodes or spaceborne nodes. The method further includes generating metadata for the sensor data based at least on physical locations associated with the physical nodes and storing the sensor data in one or more data stores in accordance with the metadata.

This Overview is provided to introduce a selection of concepts in a simplified form that are further described below in the Technical Disclosure. The Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
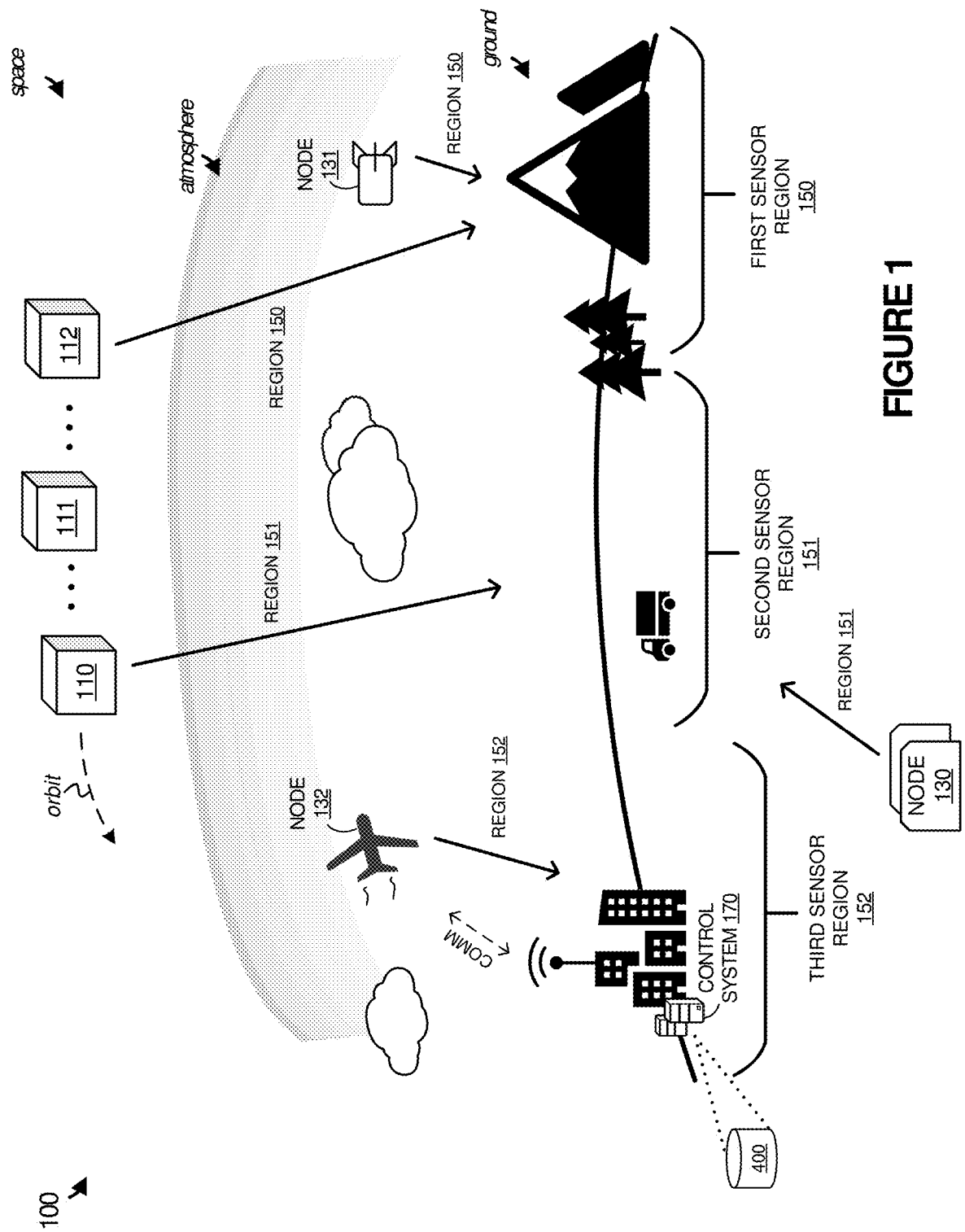
FIG. 1 illustrates a system to manage sensor data from physical nodes according to an implementation.

FIG. 1 illustrates a system 100 to manage sensor data from physical nodes according to an implementation. System 100 includes physical nodes 110-112 and 130-132, and control system 170. Physical nodes 110-112 are representative of spaceborne nodes that may comprise satellites, shuttles, capsules, or other similar spaceborne entities. Physical nodes 131-132 are representative of atmospheric nodes, such as aircraft, airplanes, drones, balloons, or some other similar airborne objects capable of data processing and/or gathering sensor observation data. Physical nodes 131-132 may be mobile or tethered. For example, a balloon device might be mobile, tethered, or both. Physical node 130 is representative of a surface-based data observation node. In some examples, physical node 130 may be mobile and comprise a car, truck, ship, vessel, vehicle, train, or other surface or subsurface-going vessel. In other examples, physical node 130 may be stationary and comprise a building, antenna array, tower, or other structure. Any number of satellite nodes, atmospheric nodes, and surface nodes may be employed.

In operation, physical nodes 110-112 and 130-132 are deployed to provide various operations for different tenants of system 100. These operations may include military, commercial, government, and civilian observation or monitoring operations, communications operations, navigation operations, weather operations, and research operations. In providing the required operations, physical nodes 110-112 and 130-132 may be equipped with sensors, wherein the sensors may comprise motion sensors, imaging sensors, heat and/or thermal sensors, electromagnetic spectrum sensors, laser sensors, lidar or radar sensors, proximity sensors, seismic sensors, meteorological sensors, chemical/radiation/nuclear/electronic/signal sensors, or some other sensors. As an example, physical node 110 may include an imaging sensor that captures sensor data for second sensor region 151. This sensor data may then be used by one or more of the tenant applications to provide the desired operations.

In some implementations, to provide the desired operations in physical nodes 110-112 and 130-132, the tenants may deploy applications that are allocated resources in physical nodes 110-112 and 130-132 to provide the corresponding operation. In particular, each of the applications may execute across one or more of physical nodes 110-112 and 130-132, wherein the applications may be allocated physical resources, such as processing resources, storage resources, sensor resources, or some other resource to provide the required operation. The applications may further be provided with access to a unified sensor data store 400 that is used to store the sensor data gathered from physical nodes 110-112 and 130-132. Accordingly, although data may not initially be processed by an application in physical nodes 110-112 and 130-132, sensor data store 400 may be used to store the data for later processing by an application in system 100.

To manage the sensor data within sensor data store 400, control system 170 may process the sensor data to determine metadata that can be used in organizing the sensor data for later requests by the applications. This metadata may be based on the location of the physical node (e.g., geographic location or region for the sensor data), may be based on the type of sensor, may be based on the quality of the data (e.g., obstructions), may be based on objects of interest identified in the sensor data, may be based on the time that the sensor data was gathered, or may be based on any other information related to gathering the sensor data. For example, sensor data from physical node 110 may be collected as physical node 110 traverses second sensor region 151. After collection, the sensor data may be communicated to control system 170, wherein control system 170 may process the sensor data to determine metadata associated with the sensor data, wherein the metadata may include location information, such as an indication that the sensor data is related to second sensor region 151, a time stamp related to when the data was obtained, information about objects of interest within the region, wherein the objects of interest may comprise vehicles, personnel, wildlife, or other objects of interest identifiable using image processing or other sensor processing operations, or some other metadata.

In some implementations, the metadata may be used as part of a common or unified namespace that permits that various applications to access the sensor data using the metadata. In particular, the common namespace may provide information to the various physical nodes, control systems, or other systems of system 100 that permits the various elements to identify the requests for sensor data and determine the storage location associated with the request. Advantageously, the various applications operating in system 100 may request sensor data using the corresponding metadata, the elements may determine the physical storage location associated with the metadata as part of the common namespace, wherein the physical storage location may be in any one of the physical data stores, and the elements may provide the data to the requesting application.

Once the data is stored in sensor data store 400, one or more applications executing as part of system 100 may access sensor data store 400 to provide desired operations. In some implementations, the applications may execute on physical nodes 110-112 and 130-132, however, one or more applications may execute in a data center capable of accessing sensor data store 400 to provide the sensor data operations. In some implementations, data may be requested and obtained from sensor data store 400 using the metadata. For example, if an application were executing on physical node 130, the application may generate a request that indicates metadata of interest for the application, such as a sensor region of interest, a type of sensor of interest, and a time period of interest. Once provided, control system 170 may identify sensor data within sensor data store 400 and provide the required data to node 130 for additional processing. In some examples, the metadata in sensor data store 400 may include permissions information that indicates applications available to access the corresponding data. The permissions information may be determined based on the identity of the sensor, the region associated with the sensor data, any objects of interest identified in the sensor data, or any other factor. As a result, each time the data is requested from sensor data store 400, control system 170 may identify the application requesting the data and determine if the application is allocated permissions to access the requested data.

Figure 2:
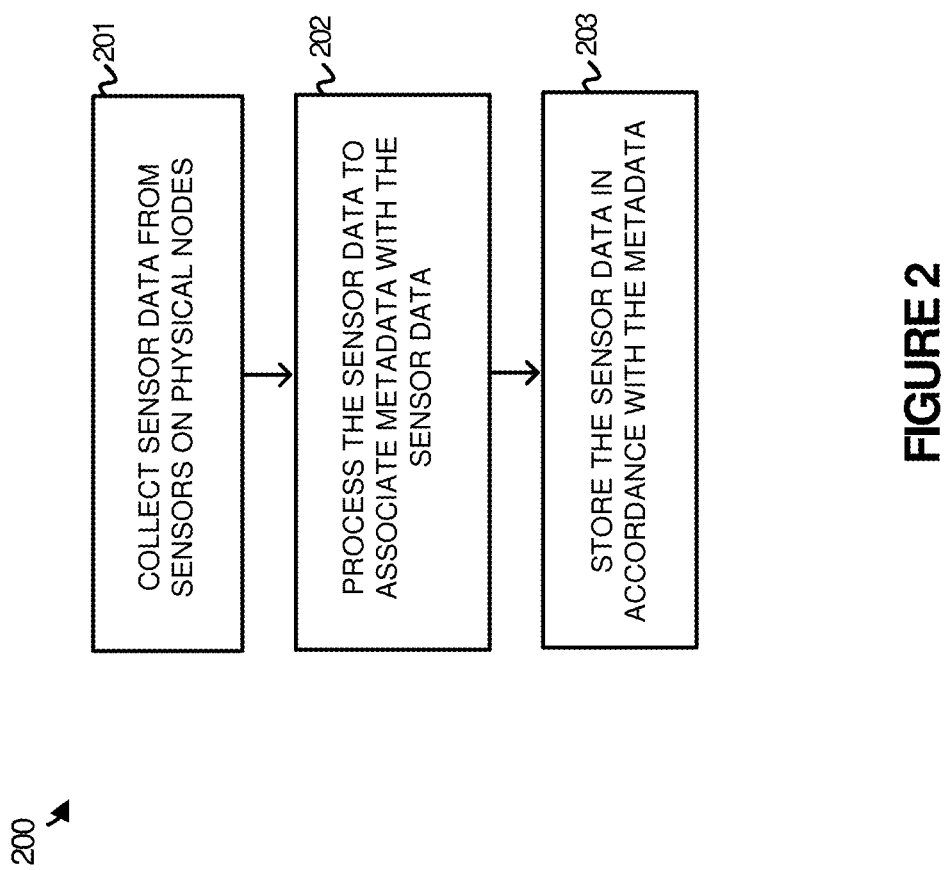
FIG. 2 illustrates an operation of a control system to manage sensor data from physical nodes according to an implementation.

FIG. 2 illustrates an operation 200 of a control system to manage sensor data from physical nodes according to an implementation. The processes of operation 200 are referenced parenthetically in the paragraphs that follow with references to systems and elements of system 100 of FIG. 1. Although operation 200 is demonstrated with a ground control system, it should be understood that control system 170 may be implemented wholly or partially in one or more physical nodes of system 100.

As depicted, ground control system 170 may obtain (201) sensor data from sensors on physical nodes of system 100, wherein the plurality of physical nodes comprises at least spaceborne or airborne nodes. In some implementations, the sensor data may be communicated as it is captured, however, the sensor data may be communicated periodically, based on a request from control system 170, or at some other interval. The sensor data may be communicated directly to control system 170 or may be communicated over one or more intermediary nodes to control system 170. For example, when physical node 112 obtains sensor data from first sensor region 150, the sensor data may be communicated over physical nodes 110-111 for transmission to control system 170.

As the sensor data is obtained, control system 170 may generate metadata (202) for the sensor data based at least on physical locations of the physical nodes. The metadata associated with the sensor data may include a geographic region covered by the corresponding physical node, a time stamp for when the data was obtained, identifiers for objects of interest identified in the sensor data, or some other metadata information for the sensor data. In some implementations, at least a portion of the metadata may be determined at the physical node with the sensor, wherein the physical node may associate location information and timestamps with the sensor data as it is received by the various sensors. Additionally, processing may be performed, either by control system 170 or a physical node in system 100 to identify further metadata to be associated with the sensor data. This processing may include image processing to identify objects of interest in the metadata, image optimization to modify a first format to a second format and store information about the format, or some other metadata operation.

In some implementations, data may be gathered from sensors based on the requirements of applications executing in system 100. For example, physical node 112 may gather imaging data about first sensor region 150 to support an application executing on physical node 112 or some other node or data center of system 100. In addition to providing the data to the application, physical node 112 may communicate the sensor data to control system 170, such that the data may be stored in sensor data store 400. In some examples, in addition to or in place of the applications obtaining the data directly from the sensors, the physical nodes in system 100 may gather data from at least a portion of the available sensors and provide the data to control system 170 for storage in data store 400. Once stored, various applications in system 100 may generate requests and obtain the data from sensor data store 400.

In some examples, in determining the metadata to be associated with the sensor data, control system 170 may allocate permissions to the sensor data that indicate applications that are capable of accessing the data. These permissions may be based on the region associated with the sensor data, the time stamp associated with the data, the objects of interest that are identified in the data, the identity of the sensor that generated the data, or some other information. For example, a first application require exclusivity to data of second sensor region 151 when an object of interest is identified in second sensor region 151. As a result, when the object of interest is identified, control system 170 may limit availability of the data to the single application. In other examples, restrictions may be generated based on the location of the satellite, time stamps associated with the sensor data, or some other element, including combinations thereof.

After the metadata is determined for the sensor data from physical nodes 110-112 and 130-132, control system 170 further stores the sensor data in accordance with the metadata in one or more data stores accessible to applications executing in system 100. In some implementations, the metadata may be used to store data in relation to other sensor data with commonalities. The commonalities may comprise location similarities, time period similarities, objects of interest, or some other similarity identifiable using the metadata. In some examples, the metadata may be used to store sensor data together with other sensor data for an application or applications. To provide this operation, control system 170 may maintain data requirement information for the various applications operating in system 100, wherein the data requirement information may include information about geographic locations of interest, objects of interest to the application, time periods of interest, or some other information, including combinations thereof. As a result, when the metadata satisfies similarity criteria to the data requirements of an application, the sensor data may be stored in a location associated with the application. In some examples, multiple applications may access the same sensor data, however, it should be understood that the data may be stored as multiple instances to support different applications.

In some examples, in generating the metadata associated with the sensor data, control system 170 may generate the metadata based on one or more factors, wherein the factors may include physical locations associated with the physical nodes and times or timestamps associated with the capture of the sensor data. Once the metadata is generated for the metadata, control system 170 may select one or more data stores for storage of the sensor data based on the metadata, wherein one or more applications may access the sensor data to consume and process the sensor data from the one or more data stores. Control system 170 may select the one or more data stores for storing the data based on the application requirements of the applications (e.g., types of sensor data associated with the applications, metadata requirements associated with the applications, etc.), may select the one or more data stores based on metadata similarities between the currently collect sensor data and previously stored sensor data, or may be determined using any other factor. In at least one example, the applications executing in system 100 may be associated with sensor data requirements, wherein the sensor data requirements may define metadata of interest for the application. As a result, when sensor data is identified with metadata associated with a particular application, control system 170 may store the sensor data in a data store accessible to the application. In some examples, the data may be stored based on accessibility information associated with the application and the various data stores, wherein the accessibility information may include latency, throughput, physical locality between the application and the data store, or other accessibility factors. Based on the accessibility information the data may be stored in a data store of the one or more data stores.

Although demonstrated in the example of FIG. 1 with a single data store 400, some examples of system 100 may deploy multiple data stores that can provide distributed data storage for the various applications. In some implementations, control system 170 may determine relevant applications or storage locations for sensor data based on the metadata. As an example, control system may determine the application or applications that are relevant to sensor data based on the metadata associated with the sensor data. Once the applications are identified, control system 170 may identify at least one data store for the sensor data based on the relevant applications and store the data in the data stores. The sensor data may be stored based on latency, throughput, shortest path, or some other accessibility factor related to the applications. Thus, if an application were executing on a first physical node, control system 170 may determine accessibility information between the first physical node and one or more data stores available to the first physical node. Once determined, control system 170 may use the information to store the data in at least one of the data stores. Although data may initially be stored in a first location, control system 170 may migrate the data to a second data store based on the requirements of the applications. In some examples, control system 170 may monitor the requests for the sensor data and migrate the data based on the maintained accessibility information for the requesting applications.

Figure 3:
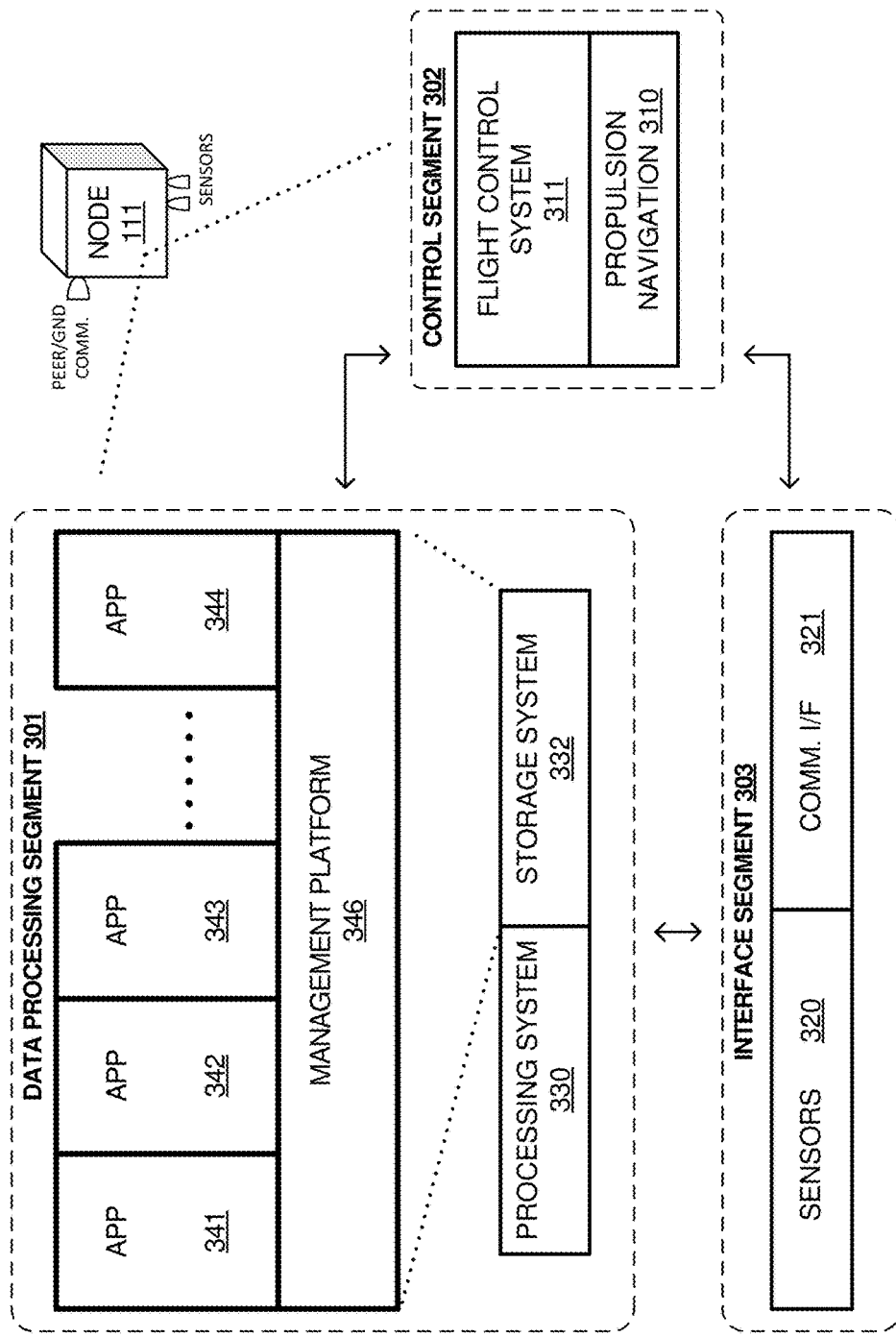
FIG. 3 illustrates an expanded view of a physical node according to an implementation.

FIG. 3 illustrates an expanded view 300 of physical node 111 of FIG. 1 according to an implementation. Physical node 111 can be an example of any of nodes 110-112 and 130-132 of FIG. 1, although variations are possible. Physical node 111 includes data processing segment 301, control segment 302, and interface segment 303. Data processing segment includes processing system 330 and storage system 332 that stores applications 341-344 that execute via management platform 346. Control segment includes flight control system 311 and propulsion navigation 310. Interface segment 303 includes sensors 320 and communication interface 321.

As described herein, physical nodes in an observation system may provide a platform for various tenants to deploy and execute applications that provide various operations. These operations may include military and civilian observation operations, communications operations, navigation operations, weather operations, and research operations. As depicted in expanded view 300, data processing system 301 includes processing system 330 and storage system 332, where storage system 332 stores management platform 346 (operating system, hypervisor, or the like), and applications 341-344. Applications 341-344 execute on top of management platform 346 and may operate inside of one or more logical nodes, where the logical nodes may comprise containers, virtual machines, or some other similar virtualized element. Applications 341-344 may comprise non-virtual applications that execute via an operating system in some examples. Applications 341-344 may be provided processing resources, storage resources, sensor resources, and the like by management platform 346, wherein management platform 346 may provide the resources in accordance with operational requirements of the application. The operational requirements may comprise execution periods for the application, sensor requirements for the application, storage requirements of the application, or some other requirement defined by the application creator.

In providing the required operations, each of applications 341-344 may access data obtained from one or more sensors 320 or sensors on other physical nodes in the system. The sensors may include motion sensors, imaging sensors, heat and/or thermal sensors, electromagnetic spectrum sensors, laser sensors, lidar or radar sensors, proximity sensors, seismic sensors, meteorological sensors, chemical/radiation/nuclear/electronic/signal sensors, or some other similar sensors. In some implementations, rather than providing sensor data directly to the applications, the sensor data may be stored in one or more data stores that provide a unified or common sensor data storage space (unified storage namespace or unified namespace). In storing the data, management platform 346 or a control system for the physical node platform may obtain data from sensors 320 and other sensors in the platform, determine metadata associated with the sensor data, and store the sensor data in the one or more data stores in accordance with the metadata. In some implementations, the metadata may be used to identify applications associated with the sensor data. Once the applications are identified based on sensor data requirements for the applications, accessibility information may be determined that corresponds to the ability of the applications to access data from the various data stores. The accessibility information may comprise latency information, throughput information, distance information, physical locality between the data and the application, or some other information related to the data accessibility between the application and the data store. As a result, a first set of sensor data associated with a first application may be stored in a first data store, while a second set of sensor data associated with the second application may be stored in a second data store. The data stores may be available on physical nodes of the platform, may be available on a control system for the platform, or may be available in any other manner to store sensor data for the platform.

In some examples, the sensor data may be stored with the metadata in the one or more data stores based on similarities of the metadata with previously obtained sensor data. The similarities may comprise location similarities, time period similarities, or some other similarities between the metadata. Advantageously, when applications request data from the common sensor data storage, platform 346 or a control system may access larger data sets from a single storage location, even when different physical sensors were used in obtaining the data sets. In some implementations, platform 346 or the control system may provide the data to the requesting application, such that the sensor data appears to be obtained from the same physical sensor. For example, when an application requests imaging data associated with a particular geographic region, sensor data related to the request may be identified in the common data storage and provided to the requesting application as though the data was obtained from a single "logical" sensor.

In some implementations, in addition to storing the data obtained from the sensors, management platform 346 or another control element in the physical node system may store processed sensor data from applications, such as applications 341-344. In response to a request from an application, the control element may determine metadata associated with the processed sensor data and store the processed sensor data in accordance with the metadata. The storing in accordance with the metadata may include storing the sensor data with the metadata, storing the sensor data with other sensor data associated with similar metadata, storing the sensor data in a data store based on accessibility by applications associated with the metadata, or storing the sensor data in some other manner.

Once data is stored in the one or more data stores, applications may request and obtain data from the data store using the metadata. In one implementation, applications executing in system 100, such as applications 341-344, may request and obtain the data using one or more metadata objects. For example, application 341 may request that imaging data for a particular location over a defined time period be provided to the application. In response to the request, the control system may identify sensor data with metadata that qualifies for the request and the provide the identified sensor data to the requesting application. In some implementations, the control system may further perform a permissions determination to determine whether the application is capable of accessing the requested data. This permissions information may be based on the metadata, wherein each of the applications may be associated with various metadata values that indicate available sensor data for the application.

In addition to the data processing operations provided in data processing segment 301, physical node 111 further includes control segment 302. Control segment 302, which may be communicatively linked to data processing segment 301 and interface segment 303, is responsible for logistical control elements of physical node 111. The operations may include managing the deployment of solar panels on a satellite, managing the positioning of a satellite with regards to the Earth or the sun, providing a spaceborne sensor pointing and control, autonomously managing target decks or tasking priorities, or any other similar operation. When physical node 111 comprises an aircraft or atmospheric node, then control elements can include flight control systems, power systems, navigation systems, sensor pointing and control, autonomously managing target decks or tasking priorities, among other elements. When physical node 111 comprises a surface node, then control elements can include propulsion elements, power systems, powertrains, navigation systems, and the like. A flight control system might not be employed in all node types, such as stationary surface nodes.

In at least one example, flight control system 311 may monitor for requests from data processing segment 301 and determine whether the node can accommodate the request. As an example, application 344 may require movement of a satellite, aircraft, or vehicle to provide an operation with respect to a sensor of sensors 320. Control segment 302 may determine whether the movement is permitted and implement the required action if permitted. The determination of whether an action is permitted by control segment 302 may be determined based on other applications executing on the node, based on flight requirements of the node, or based on some other similar mechanism.

Also depicted in expanded view 300 is interface segment 303 with sensors 320 and communication interface 321. Interface segment 303 may be communicatively coupled to data processing segment 301 and control segment 302. Sensors 320 may comprise imaging sensors, heat sensors, proximity sensors, light sensors, or some other similar type of sensor. Sensors 320 may be accessible to applications 341-344 executing in data processing segment 301 and may further be accessible to one or more other applications executing on other nodes of the system. In at least one implementation, each of the sensors may be allocated to one or more logical nodes, where the logical nodes may each access the sensor during defined time periods, may jointly obtain data derived from the sensor at the same time (e.g. all logical nodes can access the same imaging data), or may be provided access to sensors at some other interval. In addition to sensors 320, interface segment 303 further includes communication interface 321 that may be used to communicate with other physical nodes and/or management and control systems for system 100. In some examples, communication interface 321 may work with management platform 346 to control the application communications. Thus, if application 341 required a communication with another physical node to obtain sensor data from the physical node, communication interface 321 may forward the communication to the appropriate node and obtain the data from the node.

While demonstrated in the example of expanded view 300 using a satellite node, physical nodes may be represented in a variety of forms. These physical nodes may comprise airplanes, drones, balloons, land vehicles (cars, trucks, trains, and the like), water vehicles, or some other similar physical node. These physical nodes may include a data processing segment capable of providing a platform for the applications executing thereon, may comprise a communication interface to communicate with other physical nodes and/or control systems, and may further comprise one or more sensors capable of gathering required data for the applications executing thereon.

Figure 4:
FIG. 4 illustrates a data store according to an implementation.

FIG. 4 illustrates a data store 400 according to an implementation. Data store 400 is an example data store for sensor data from system 100 of FIG. 1, although other examples may exist. Data store 400 includes metadata columns 402-404 and a column for sensor data 405. Columns 402-404 includes metadata 410-413, 420-423, and 430-433. Sensor data 405 includes sensor data 440-443. Sensor data 440-443 may represent images, meteorological data, or some other data related to sensors from physical nodes. Data store 400 is representative of sensor data in a unified namespace that can be addressed from applications of system 100. The namespace may store data across one or more data stores that can be distributed across physical nodes, control systems, or other elements of an observation platform. Although demonstrated as a table in the example of FIG. 4, it should be understood that data store 400 may store the sensor data and metadata in one or more linked lists, data trees, tables, or some other data structures, including combinations thereof.

As described herein, as sensor data is collected from various sensors across multiple physical nodes, the data may be stored in one or more data stores, wherein the data stores may represent a distributed storage system for the sensor data. In storing the sensor data, a control system determines metadata that should be appended or otherwise associated with the sensor data. The metadata may include information about the physical node gathering the data, the type of sensor used in gathering the data, location information for the physical node or region monitored by the sensor, objects of interest identified in the sensor data, or some other metadata information. In some implementations, the control system may process the sensor data to determine the metadata associated with the sensor data. This processing may include converting the format of an image and storing the format as metadata, identifying objects of interest in the sensor data using object recognition, or some other processing of the sensor data. The metadata may further be used to define permissions for accessing the sensor data by the applications. In some examples, the applications that are executing in the system may include application requirements, which define regions of interest to the application, sensors available to the application, time periods that sensor data is available, or some other information related to the application. When sensor data is obtained, the control system may compare the metadata of the sensor data to the requirements of an application to determine whether the sensor data should be accessible to the application. When the sensor data is applicable or accessible to the application, metadata with the sensor data may permit the application to request and process the data as required.

Although demonstrated in the previous examples as storing data in data store 400 from the sensors of system 100, it should be understood that the sensor data maintained in data structure 400 may include processed sensor data from applications of system 100. The processed data may include image optimization, operations to identify objects of interest, operations to convert the format of the data, or any other operation. After generating the processed sensor data, the control system or some other process may determine metadata to be stored with the processed sensor data in data structure 400. The metadata may include geographic location information, sensor type information, formatting information, or other similar metadata previously described. Additionally, the metadata may include information indicating the application that generated the processed sensor data, applications that are capable of accessing the processed sensor data, objects of interest identified during the processing, or some other metadata related to processed sensor data.

Once the sensor data is stored in data store 400, applications that are executing in the physical nodes or in a data center may access the sensor data using the corresponding metadata. For example, an application may request sensor data that corresponds to metadata 410, 420, and 430. In response to the request, the control system may identify that sensor data 440 corresponds to the request and provide sensor data 440 to the requesting application. Each of the requests to data store 400 may include one or more metadata values, wherein the control system may use the requested metadata values to determine sensor data that should be made available to the requesting application.

Figure 5:
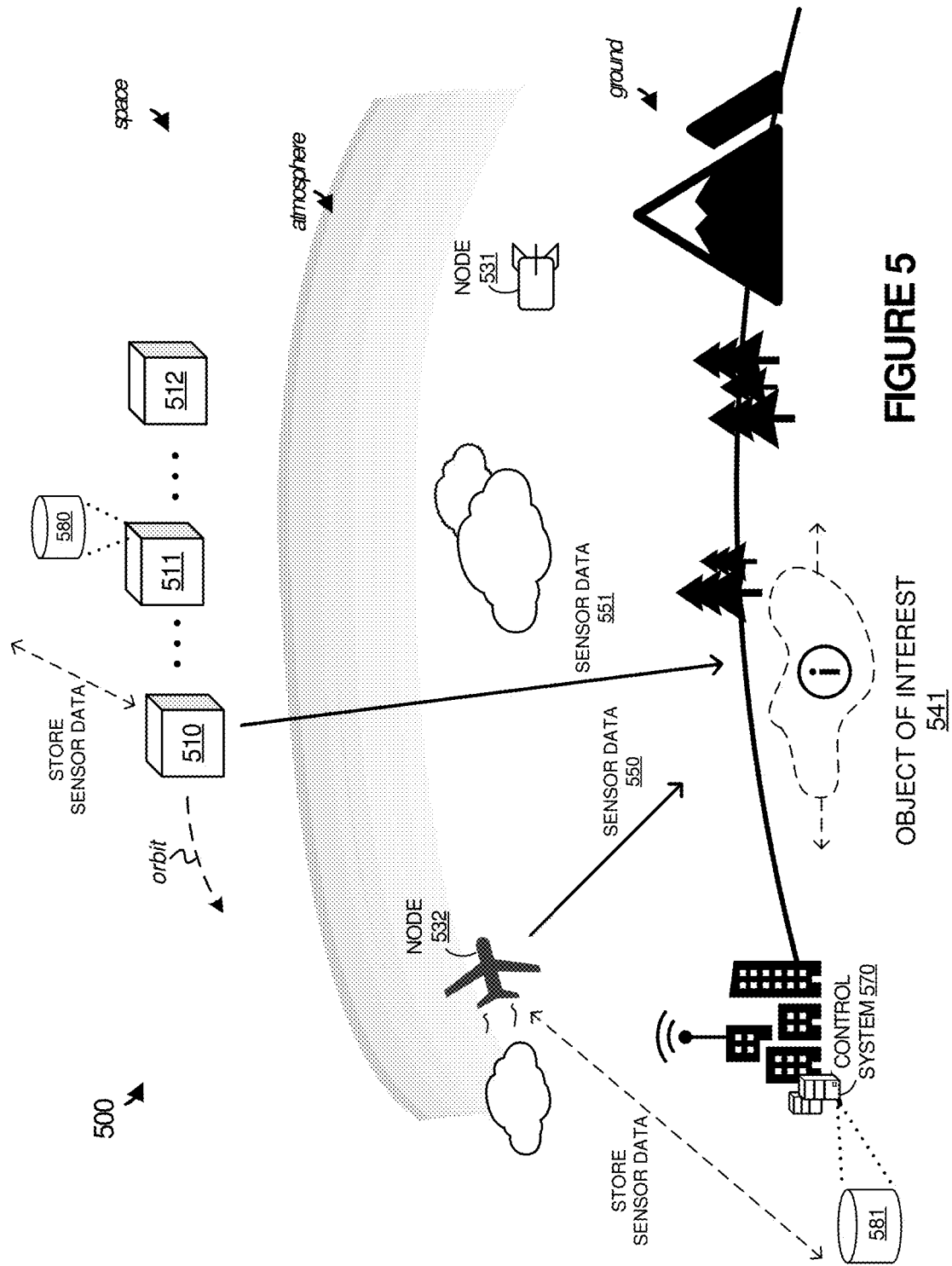
FIG. 5 illustrates an operational scenario of storing sensor data with corresponding metadata according to an implementation.

FIG. 5 illustrates an operational scenario 500 of storing sensor data with corresponding metadata according to an implementation. Operational scenario 500 includes physical nodes 510-512 and 531-532, control system 570, object of interest 541, and sensor data stores 580-581.

As depicted, physical nodes 510 and 532 gather corresponding sensor data 550-551 using one or more sensors on the physical nodes. Here, rather than communicating the data to a control system to determine the metadata and storage configuration of the sensor data, each physical node of physical nodes 510 and 532 may determine metadata associated with the sensor data and store the sensor data based at least in part on the metadata. In particular, physical node 510 generates metadata associated with sensor data 551 and directs sensor data 551 to be stored in sensor data store 580, while physical node 532 generates metadata associated with sensor data 550 and directs sensor data 550 be stored in sensor data store 581. In determining where to store the sensor data, the physical nodes may compare the metadata with criteria that indicates where the data should be stored. The storage of the sensor data may be based on accessibility information of applications related to the sensor data, may be based on the proximity of the data store to the physical node obtaining the sensor data, or may be determined in any other manner. For example, the sensor data gathered from physical node 532 may comprise imaging data, while the sensor data gathered from physical node 510 may comprise data related to radiation for object of interest 541. As a result, a first application that requires the imaging data may possess better accessibility to sensor data store 581 over sensor data store 580. Consequently, the imaging sensor data may be stored in sensor data store 581 to provide access of the data to the corresponding application.

In some implementations, the applications executing in a system may be associated with metadata of interest that is defined by the tenant associated with the application. In particular, when sensor data is gathered, the metadata associated with the sensor data may be compared to the metadata of interest for each of the applications to determine applications related to the sensor data. Once determined, the control system may store the data in one or more data stores accessible to the related applications. Further, the control system may apply permissions that limit the accessibility of the data to the related applications.

Although sensor data is stored in different physical locations, it should be understood that the addressable space of the data may be distributed, permitting applications to access the sensor data using a common metadata scheme. For example, an application executing on physical node 512 may initiate a request for data using one or more metadata traits associated with the required data. In response to the request, physical node 512, another physical node in the system, or control system 570 may determine the storage location of the corresponding sensor data and initiate an operation to provide the data to the requesting node. While demonstrating the initial storage of sensor data in operational scenario 500, control system 570 may further migrate data between the available data stores based on a variety of factors. These factors may include the requests from the applications, the sensor data preferences for the applications, or some other factor. Thus, while data may initially be stored in sensor data store 580, portions of the sensor data may be migrated to sensor data store 581.

Figure 6:
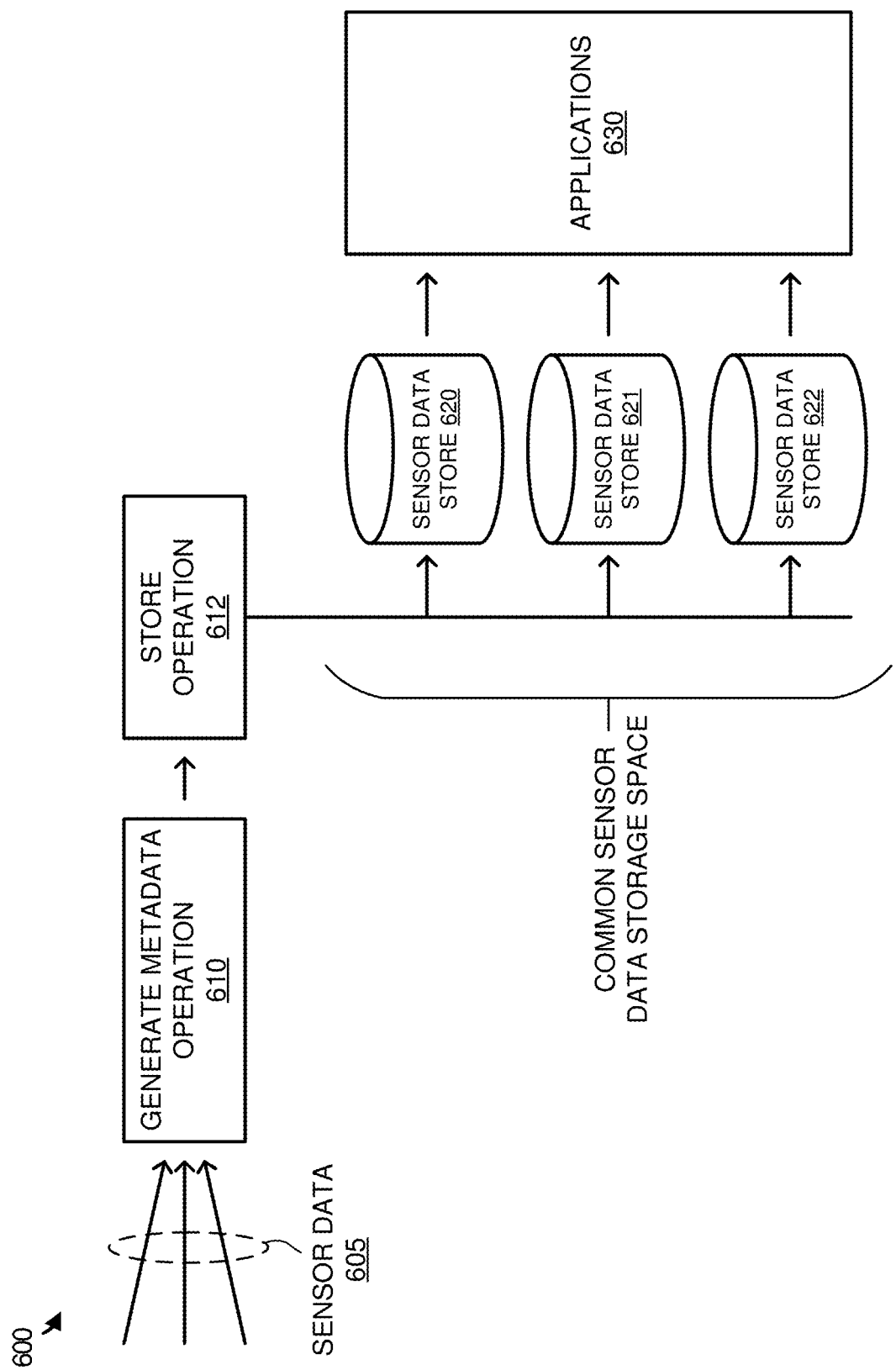
FIG. 6 illustrates an operational scenario to store and access sensor data from a data store according to an implementation.

FIG. 6 illustrates an operational scenario 600 to store and access sensor data from a data store according to an implementation. Operational scenario 600 includes sensor data 605, operations 610 and 612, sensor data stores 620-622, and applications 630. Operations 610 and 612 may be implemented by a control system or may be distributed across physical nodes and ground control systems of a platform.

Sensor data 605 is collected from sensors from one or more physical nodes and provided to generate metadata operation 610. Operation 610 identifies traits associated with the sensor data and generates metadata based on the traits, wherein the metadata may indicate the sensor type associated with the sensor data, the physical node associated with the sensor data, geographic location information associated with the sensor data, or some other metadata information. In some implementations, the sensor data may be processed by operation 610 to determine metadata using object identification processing, image optimization, or some other process to generate metadata associated with the sensor data.

Once the metadata is generated, store operation 612 determine a data store of data stores 620-622 to store the sensor data and corresponding metadata. In determining where to store the sensor data, operation 612 may store the data based on requirements of the applications in relation to the metadata, based on accessibility to the sensor data at each of the data stores (e.g., latency, throughput, physical locality, etc.), may store the data based on proximity to the sensor, or any other factor. Once the sensor data is stored, applications 630 may request and obtain the sensor data using the metadata. In handling the data requests for the applications, a process on the local physical node supporting the execution of the application may determine a storage location in data stores 620-622 to support the request and obtain the data from the corresponding location. In some implementations, the various physical nodes and systems hosting the applications may maintain mapping information capable of mapping requests with various metadata to their corresponding storage location (data store, storage path, etc.) The information may be provided by a control system or via a distributed communication between the physical nodes and systems regarding the storage of sensor data to the data stores. In other examples, a request may be forwarded to a control system, wherein the control system may use mapping information to identify the corresponding storage location for sensor data associated with the request and provide the sensor data to support the request.

In some implementations, in addition to the data stored using store operation 612 from the sensors, applications 630 may further store processed sensor data. The processed sensor data may comprise modified formats from the raw sensor data, may comprise optimized versions of the sensor data, or may comprise some other sensor data. When the processed sensor data is generated, the application or another process in the physical observation node platform may generate metadata, such that the processed data may be stored in the unified or common data store with the other sensor data (unified namespace).

Figure 7:
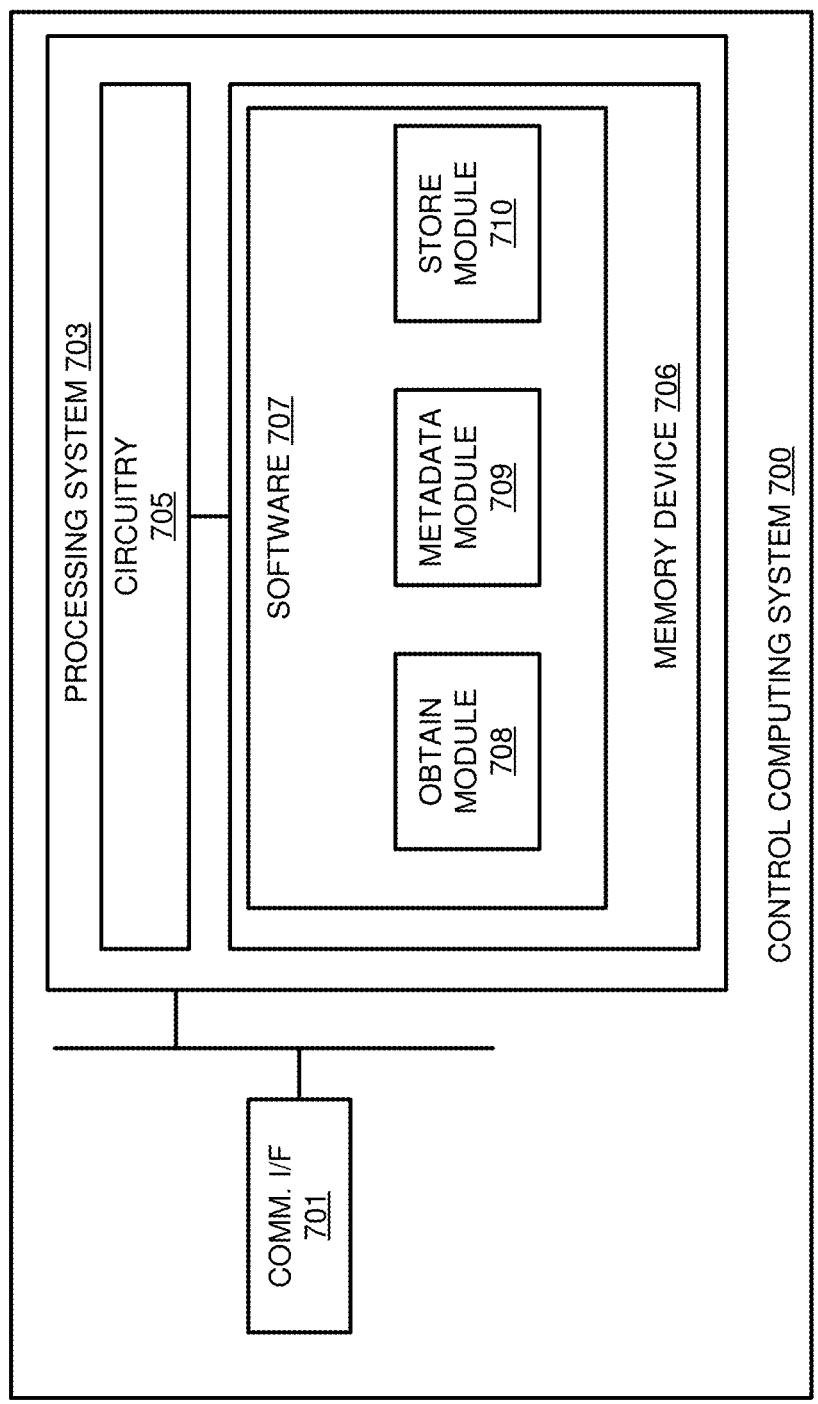
FIG. 7 illustrates a control computing system according to an implementation.

FIG. 7 illustrates a control computing system 700 according to an implementation. Computing system 700 is representative of any computing system or systems with which the various operational architectures, processes, scenarios, and sequences disclosed herein for a control system may be implemented. Computing system 700 is an example of control system 170 of FIG. 1, although other examples can be employed. In some implementations, computing system 700 may represent one or more physical nodes, a ground control system, or some other system capable managing sensor data, including combinations thereof. Computing system 700 comprises communication interface 701 and processing system 703. Processing system 703 is linked to communication interface 701. Processing system 703 includes processing circuitry 705 and memory device 706 that stores operating software 707. Computing system 700 may include other components such as a power system, battery, and enclosure that are not shown for clarity.

Communication interface 701 comprises components that communicate over communication links, such as network cards, ports, radio frequency (RF), processing circuitry and software, or some other communication devices. Communication interface 701 may be configured to communicate over conductive, wireless, or optical links. Communication interface 701 may be configured to use Time Division Multiplex (TDM), Code Division Multiplex (CDM), Internet Protocol (IP), Ethernet, optical networking, wireless protocols, communication signaling, or some other communication format, including combinations thereof. In at least one implementation, communication interface 701 may be used to communicate with one or more physical nodes in a system, where the physical nodes may comprise mobile or stationary devices, such as satellites, drones, airplanes, or balloons, land and water vehicles, stationary surface or sub-surface nodes, or some other devices.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory.

Processing circuitry 705 is typically mounted on a circuit board that may also hold memory device 706 and portions of communication interface 701. Operating software 707 comprises computer programs, firmware, or some other form of machine-readable program instructions. Operating software 707 includes obtain module 708, metadata module 709, and store module 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, obtain module 708 directs processing system 703 to obtain sensor data from a plurality of sensors. In response to receiving the sensor data, metadata module 709 directs processing system 703 to generate metadata for the sensor data based at least on location information associated with the sensor data. The metadata may indicate a time stamp associated with the obtained data, a geographic region associated with the obtained data, objects of interest identified in the sensor data, or some other information related to the sensor data. For example, when sensor data is obtained from an imaging sensor, metadata module 709 may generate metadata that indicates the type of imaging sensor used, the location of the imaging sensor (physical location) of the sensor when the image was obtained, the region being imaged, objects of interest in the sensor data, or some other information. In some implementations, the metadata may include permissions information capable of defining the various application that can access the data. The permissions information may be based on the other determined metadata, wherein applications may be permitted to access sensor data with particular metadata traits, such as location information, time stamps, sensor types, and the like.

Once the metadata is generated for the sensor data, store module 710 directs processing system 703 to store the sensor data in accordance with the metadata. In some implementations, store module 710 may store sensor data with other sensor data that corresponds to similar metadata. For example, store module 710 may determine a geographic region and time stamp associated with the sensor data and store the sensor data with other sensor data that corresponds to the same geographic region and time stamp. Thus, any application that requires information with the corresponding metadata may be provided from the same storage location.

In some examples, the sensor data may be stored across multiple data stores that correspond to different physical locations but maintain a single addressing or distributed storage space. In particular, the applications of the system may request and receive sensor data using the metadata allocated to the sensor data, wherein the physical node executing the application, or a control system for the platform, may determine the appropriate data store or stores for the sensor data. In determining where to store sensor data in the data stores, store module 710 may determine one or more applications that require access to the data based on the metadata generated for the sensor data. Once the applications are identified, accessibility information is assessed to determine data stores that are efficiently accessible to the associated applications. The accessibility information may comprise latency information, throughput information, or some other accessibility information. Once the data stores are identified, store module 710 may store the data in one or more data stores, such that the data is accessible to the required applications.

Although demonstrated in the previous example as storing sensor data obtained from sensors, similar operations may also be provided to processed sensor data from applications executing. In some implementations, as sensor data is processed by an application, wherein the processing may comprise image optimization, object of interest identification, or some other processing, the application may request that the processed sensor data be stored in the common sensor data storage space. In response to the request, store module 710 may determine metadata associated with the processed sensor data and store the processed sensor data in accordance with the processed sensor data.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
generating metadata that indicates traits determined for sensor data obtained by a plurality of physical nodes, the traits comprising one or more among identifiers for objects of interest identified in the sensor data, sensor types that obtained the sensor data, physical locations corresponding to ones of the plurality of physical nodes that obtained the sensor data, and times corresponding to capture of the sensor data;
comparing the metadata determined for the sensor data to requirements of an application to determine whether the sensor data is accessible by the application, wherein the requirements define at least one among regions of interest accessible by the application, sensors accessible by the application, and time periods for the sensor data available to the application;
based at least on the sensor data being accessible by the application, storing additional metadata with the sensor data indicating permissions for the application to access the sensor data;
storing the sensor data at storage locations selected based at least on the metadata;
receiving a data request that indicates metadata of interest to obtain target sensor data for the application;
based at least on a mapping applied between the metadata of interest and the storage locations, determining a target storage location of the target sensor data correlated to the metadata of interest;
based on the permissions applicable to the application, determining portions of the target sensor data accessible to the application; and
providing the portions of the target sensor data from the target storage location for the application.

2. The method of claim 1, wherein the sensor types comprise one or more among motion sensors, imaging sensors, heat or thermal sensors, electromagnetic spectrum sensors, laser sensors, lidar or radar sensors, proximity sensors, seismic sensors, and meteorological sensors.

3. The method of claim 1, further comprising:
processing the sensor data to identify the objects of interest in the sensor data by performing image processing in at least one among the plurality of physical nodes.

4. The method of claim 1, wherein selecting the storage locations for storage of the sensor data based at least on the metadata comprises:
identifying accessibility information associated with the application with respect to the storage locations, wherein the accessibility information comprises at least one among latency, throughput, and physical locality between the application and one or more data stores comprising the storage locations; and storing the sensor data in the storage locations based on the accessibility information.

5. The method of claim 1, further comprising:

based on metadata values included in the metadata of interest, determining allocated permissions for the application to access at least the portions of the target sensor data; and limiting accessibility of at least the portions of the target sensor data to the application based on the allocated permissions.

6. The method of claim 1, wherein the metadata of interest indicates at least one among a region of interest, a type of sensor of interest, and a time period of interest; and further comprising:

based on the mapping, determining the target storage location of at least the portion of the sensor data corresponding to at least one among the region of interest, the type of sensor of interest, and the time period of interest.

7. The method of claim 1, further comprising:

maintaining mapping information that maps storage locations to metadata values.

8. A computing apparatus comprising:

one or more non-transitory computer readable storage media;

and program instructions stored on the one or more non-transitory computer readable storage media that, when executed by a processing system, direct the processing system to:

generate metadata that indicates traits determined for sensor data obtained from a plurality of physical nodes, wherein the traits comprise one or more among identifiers for the objects of interest identified in the sensor data, sensor types that obtained the sensor data, physical locations corresponding to ones of the plurality of physical nodes, and times corresponding to capture of the sensor data;

compare the metadata determined for the sensor data to requirements of the application to determine whether the sensor data is accessible by an application, wherein the requirements define at least one among regions of interest accessible by the application, sensors accessible by the application, and time periods for the sensor data available to the application;

based at least on the sensor data being accessible by the application, store additional metadata with the sensor data indicating permissions for the application to request the sensor data;

store the sensor data at storage locations selected based at least on the metadata;

receive a data request that indicates metadata of interest to obtain target sensor data for the application;

based at least on a mapping applied between the metadata of interest and the storage locations, determine a target storage location of the target sensor data correlated to the metadata of interest;

determine, based on the permissions applicable to the application, portions of the target sensor data accessible to the application; and provide the portions of the target sensor data from the target storage location for the application.

9. The computing apparatus of claim 8, wherein the sensor types comprise one or more among motion sensors, imaging sensors, heat or thermal sensors, electromagnetic spectrum sensors, laser sensors, lidar or radar sensors, proximity sensors, seismic sensors, and meteorological sensors.

10. The computing apparatus of claim 8, wherein the program instructions further direct the processing system to:

perform image processing in at least one among the plurality of physical nodes to identify the objects of interest in the sensor data.

11. The computing apparatus of claim 8, wherein selecting the storage locations for storage of the sensor data based at least on the metadata comprises:

identifying accessibility information associated with the application with respect to the storage locations, wherein the accessibility information comprises at least one among latency, throughput, and physical locality between the application and one or more data stores comprising the storage locations; and storing the sensor data in the storage locations based on the accessibility information.

12. The computing apparatus of claim 8, wherein the program instructions further direct the processing system to:

based on metadata values included in the metadata of interest, determine allocated permissions for the application to access at least the portions of the target sensor data; and limit accessibility of at least the portions of the target sensor data to the application based on the allocated permissions.

13. The computing apparatus of claim 8, wherein the metadata of interest indicates at least one among a region of interest, a type of sensor of interest, and a time period of interest; and the program instructions further direct the processing system to:

based on the mapping, determine the target storage location of at least the portion of the sensor data corresponding to at least one among the region of interest, the type of sensor of interest, and the time period of interest.

14. The computing apparatus of claim 8, wherein the program instructions further direct the processing system to:

maintain mapping information that maps storage locations to metadata values.

15. A method comprising:

storing sensor data in storage locations according to metadata indicating traits of the sensor data, wherein the traits comprise one or more among identifiers for objects of interest identified in the sensor data, sensor types that obtained the sensor data, times corresponding to capture of the sensor data, and physical locations corresponding to ones of a plurality of physical nodes that obtained the sensor data;

comparing the metadata to requirements of an application to determine whether the sensor data is accessible by the application, wherein the requirements define at least one among regions of interest accessible by the application, sensors accessible by the application, and time periods for the sensor data available to the application;

based at least on the sensor data being accessible by the application, storing additional metadata indicating permissions for the application to access the sensor data;

receiving a data request that indicates metadata of interest to obtain target sensor data for the application;

based at least on a mapping determined between the metadata of interest and the storage locations, determining a target storage location of at least the target sensor data correlated to the metadata of interest;

based on the permissions applicable to the application, determining portions of the target sensor data accessible to the application; and providing the portions of the target sensor data from the target storage location for the application.

16. The method of claim 15, wherein the metadata of interest indicates at least one among a region of interest, a type of sensor of interest, and a time period of interest; and further comprising:

based on the mapping, determining the target storage location of at least the portion of the sensor data corresponding to at least one among the region of interest, the type of sensor of interest, and the time period of interest.

* * * * *